(12) United States Patent
Bishop et al.

(10) Patent No.: US 10,106,446 B2
(45) Date of Patent: Oct. 23, 2018

(54) WASTEWATER OVERFLOW SYSTEMS AND METHODS

(71) Applicant: Evoqua Water Technologies LLC, Warrendale, PA (US)

(72) Inventors: Andrew G. Bishop, Windham, ME (US); Steven E Woodard, Cumberland, ME (US); Paul M. Rodrigues, Scarborough, ME (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 487 days.

(21) Appl. No.: 14/437,365

(22) PCT Filed: Mar. 14, 2013

(86) PCT No.: PCT/US2013/031430
§ 371 (c)(1),
(2) Date: Apr. 21, 2015

(87) PCT Pub. No.: WO2014/065859
PCT Pub. Date: May 1, 2014

(65) Prior Publication Data
US 2015/0251938 A1    Sep. 10, 2015

Related U.S. Application Data

(60) Provisional application No. 61/716,663, filed on Oct. 22, 2012, provisional application No. 61/717,865, filed on Oct. 24, 2012.

(51) Int. Cl.
*C02F 3/12* (2006.01)
*C02F 11/02* (2006.01)
(Continued)

(52) U.S. Cl.
CPC ............... *C02F 3/121* (2013.01); *C02F 3/12* (2013.01); *C02F 2101/10* (2013.01);
(Continued)

(58) Field of Classification Search
CPC ........ B01D 21/01; B01D 21/02; B01D 21/08; B01D 21/24; B01D 21/2405; B01D 21/2433; B01D 21/245; B01D 21/30; C02F 1/008; C02F 1/52; C02F 1/5209; C02F 1/5236; C02F 1/5245; C02F 1/5281; C02F 1/54; C02F 1/56; C02F 3/006;
(Continued)

(56) References Cited

U.S. PATENT DOCUMENTS 3,142,638 A * 7/1964 Blaisdell ............ B01D 21/0009
                                              210/695
4,735,725 A    4/1988 Reischl et al.
(Continued)

FOREIGN PATENT DOCUMENTS

CN    101054249 A    10/2007
CN    101568493 A    10/2009
(Continued)

*Primary Examiner* — Joseph Drodge

(57) ABSTRACT

Systems and methods for treating a wastewater are provided. The wastewater treatment system and methods allows for effective treatment of wastewater during conditions that may cause increased wastewater flow to the system.

11 Claims, 6 Drawing Sheets

(51) Int. Cl.
  C02F 11/12 (2006.01)
  B01D 21/24 (2006.01)
  B01D 21/30 (2006.01)
  *C02F 103/00* (2006.01)
  *C02F 101/10* (2006.01)
  *C02F 101/16* (2006.01)

(52) U.S. Cl.
  CPC .... *C02F 2101/105* (2013.01); *C02F 2101/16* (2013.01); *C02F 2103/001* (2013.01); *C02F 2203/00* (2013.01); *C02F 2301/04* (2013.01); *C02F 2301/043* (2013.01); *C02F 2305/12* (2013.01); *Y02W 10/15* (2015.05)

(58) Field of Classification Search
  CPC .......... C02F 3/121; C02F 3/1205; C02F 3/12; C02F 3/1215; C02F 9/00; C02F 2101/04; C02F 2101/10; C02F 2101/105; C02F 2101/16; C02F 2301/043; C02F 2103/001; C02F 2305/12; C02F 2203/00; C02F 11/02; C02F 11/12; Y02W 10/15
  USPC ........ 210/151, 173, 194, 200–202, 205–207, 210/209, 253, 607, 608, 623, 625, 626, 210/631, 695, 747.2, 919, 920, 804, 259, 210/513
  See application file for complete search history.

(56) References Cited

U.S. PATENT DOCUMENTS

| | | | |
|---|---|---|---|
| 4,981,593 A * | 1/1991 | Priestley | C02F 1/488 210/613 |
| 5,624,562 A * | 4/1997 | Scroggins | C02F 3/006 210/143 |
| 6,277,285 B1 * | 8/2001 | Vion | B01D 21/0042 210/709 |
| 7,323,108 B1 * | 1/2008 | Garbett | C02F 9/00 210/607 |
| 7,435,340 B2 | 10/2008 | Johnson et al. | |
| 7,569,147 B2 | 8/2009 | Curtis et al. | |
| 7,828,976 B2 * | 11/2010 | Banerjee | C02F 1/5245 210/631 |
| 8,470,172 B2 * | 6/2013 | Woodard | C02F 3/1263 210/189 |
| 8,506,800 B2 * | 8/2013 | Woodard | C02F 3/1263 210/150 |
| 8,540,877 B2 * | 9/2013 | Woodard | C02F 3/1263 210/151 |
| 8,673,142 B2 * | 3/2014 | Woodard | C02F 3/1263 210/173 |
| 8,673,205 B2 * | 3/2014 | De Mattia | B29C 35/0227 156/196 |
| 8,702,987 B2 * | 4/2014 | Woodard | C02F 3/1263 210/607 |
| 8,845,901 B2 * | 9/2014 | Woodard | C02F 3/2846 210/616 |
| 2006/0213832 A1 * | 9/2006 | Hudson | C02F 3/12 210/626 |
| 2007/0163955 A1 | 7/2007 | Sun | |
| 2008/0073268 A1 * | 3/2008 | Cort | B03C 1/01 210/609 |
| 2008/0073278 A1 * | 3/2008 | Cort | C02F 1/488 210/695 |
| 2008/0073281 A1 * | 3/2008 | Cort | B03C 1/01 210/695 |
| 2008/0073283 A1 * | 3/2008 | Cort | B03C 1/01 210/695 |
| 2008/0203015 A1 | 8/2008 | Marston et al. | |
| 2009/0218281 A1 | 9/2009 | Sauvignet et al. | |
| 2010/0213123 A1 | 8/2010 | Marston et al. | |
| 2011/0168639 A1 * | 7/2011 | Isogami | C02F 1/488 210/695 |
| 2012/0043277 A1 | 2/2012 | Smith et al. | |
| 2015/0210574 A1 * | 7/2015 | Antonneau | B01D 21/01 210/615 |

FOREIGN PATENT DOCUMENTS

| | | |
|---|---|---|
| CN | 101823791 A | 9/2010 |
| JP | 4551650 B2 | 9/2010 |

* cited by examiner

WASTEWATER OVERFLOW SYSTEMS AND METHODS

FIELD OF TECHNOLOGY

Systems and methods for treating a wastewater are provided. The wastewater treatment system and methods allows for effective treatment of wastewater during conditions that may cause increased wastewater flow to the system.

SUMMARY

Certain embodiments of this disclosure provide for a method of treating wastewater comprising introducing a first wastewater stream to a first bioreactor to provide a first mixed liquor, and introducing a second wastewater stream to a second bioreactor to provide a second mixed liquor. The method further comprises separating the first mixed liquor in a first clarifier to provide a first treated effluent and a first activated sludge, and separating the second mixed liquor in a second clarifier to provide a second treated effluent and a second activated sludge. The method further comprises introducing a ballast to at least one of the second activated sludge and the second bioreactor to provide a ballasted activated sludge.

Certain other embodiments of the disclosure provide a system for treating wastewater comprising a bioreactor comprising a first inlet fluidly connected to a source of wastewater, and a second inlet fluidly connected to the source of wastewater and positioned downstream of the first inlet. The system further comprises a contact zone adjacent the second inlet and defined by at least a portion of a wall of the bioreactor, downstream of the second inlet, and a ballasted mixed liquor outlet fluidly connected to the contact zone. The system further comprises a clarifier fluidly connected downstream of the outlet of the bioreactor. The clarifier comprises a treated effluent outlet and a ballasted activated sludge outlet. The system further comprises a ballast subsystem fluidly connected downstream of the clarifier. The ballast subsystem comprises a ballast recovery system fluidly connected to the ballasted activated sludge outlet of the clarifier, and a source of ballast fluidly connected to the bioreactor.

In certain other embodiments of the disclosure, a method for treating wastewater is provided comprising introducing a first portion of a wastewater to a first inlet of a bioreactor, and introducing a second portion of the wastewater to a second inlet of the bioreactor. The second inlet is positioned downstream of the first inlet. The method further comprises introducing a ballast to the bioreactor, and separating a ballasted mixed liquor generated in the bioreactor to provide a treated effluent and a ballasted activated sludge in a clarifier. The method further comprises separating the ballasted activated sludge to provide a recovered ballast and a waste activated sludge.

DESCRIPTION OF THE DRAWINGS

The accompanying drawings are not intended to be drawn to scale. For purposes of clarity, not every component may be labeled in the drawings, nor is every component of each embodiment of the disclosure shown where illustration is not necessary to allow those of ordinary skill in the art to understand the disclosure.

In the drawings.

DETAILED DESCRIPTION

Figure 1A:
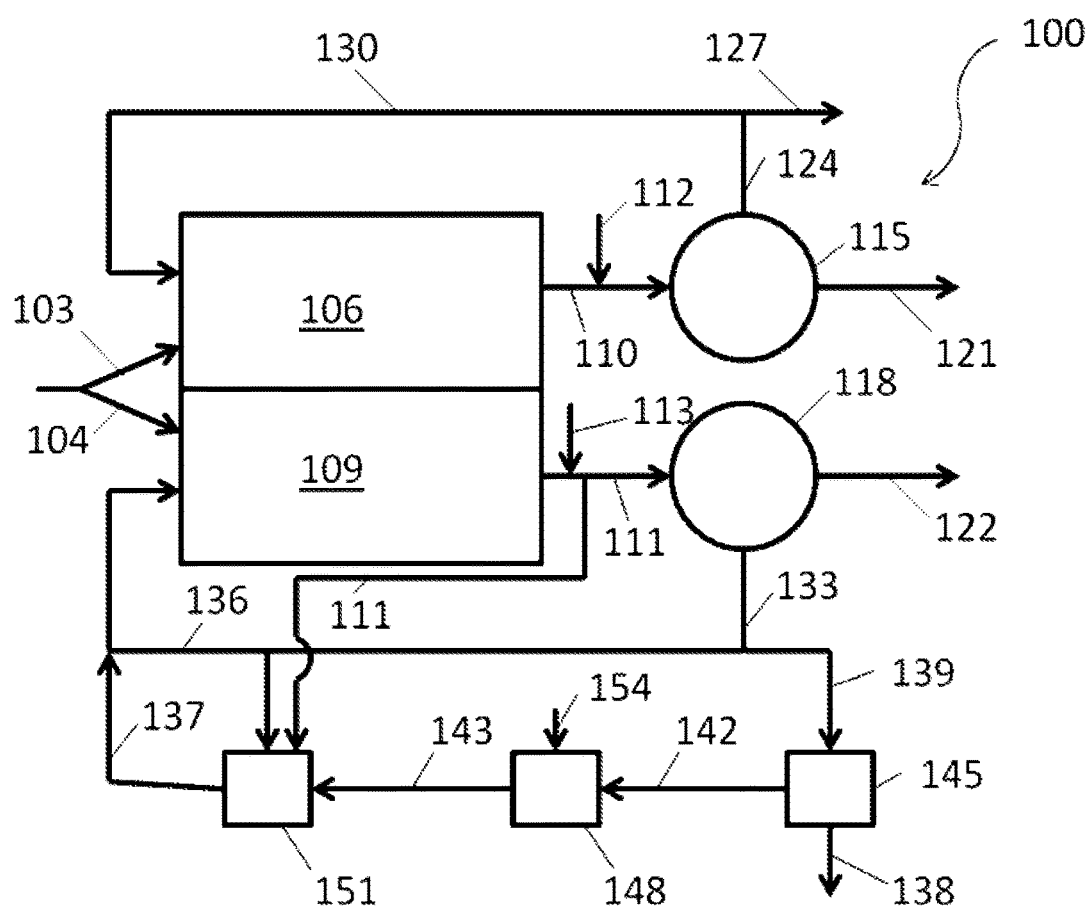
FIG. 1A presents a schematic of a water treatment system utilizing standby tankage in operational mode in accordance with one or more embodiments of the disclosure.

Elevated wastewater flow from high flow events may cause a number of problems in wastewater treatment systems. Water from storm drains in some cases may be mixed with wastewater resulting in a large increase in volume during, for example, a storm or rainfall event. When this occurs, often much of the excess wastewater goes un-treated and is simply discharged resulting in pollution problems in natural waterways including rivers, bays and estuaries. Under these conditions, the discharge limits for various pollutants are exceeded.

The present disclosure provides systems and methods to allow existing wastewater treatment plants that may encounter issues during high flow events such as with moderate to severe storm water flows and other rainfall events to provide secondary treatment to increased flows, including maximum and peak flows, without surrendering to completely bypassing secondary treatment or installing expensive new tankage. The disclosure may provide significant cost savings and footprint reduction compared to currently available alternatives and conventional wastewater treatment systems.

The present disclosure may allow activated sludge systems to treat higher peak flows from storm events which may result in faster settling secondary solids, reduced clarifier solids loading rates, enhanced bioreactor kinetics, reduced solids loss and associated pollutant loss from secondary clarifiers and reduced secondary bypass of wet weather flow. The disclosed systems and methods may provide a number of advantages over current treatments. For example, by incorporating a ballasted biomass system into a wastewater treatment system, ballasted mixed liquor may be produced that allows for faster settling than other conventional treatments and may accommodate appreciably higher secondary clarifier loading rates. Treatment may be improved because wastewater would not have to be fully bypassed around secondary treatment to maintain acceptable loading rates on the secondary clarifier. In addition to improved total suspended solids (TSS) removal, biological oxygen demand (BOD), phosphorus and nitrogen removals may be also improved through biological treatment and removal of biological solids from the treated effluent. Reduced biological solids may result in more efficient disinfection in both chlorine- and UV-based systems.

Certain embodiments are intended to provide secondary treatment of storm water that flows into existing wastewater treatment facilities using a standby ballasted biological treatment system and a series of off-line tanks.

In certain embodiments, a standby ballasted biological treatment system may be used to provide storm flow treatment within the existing tankage using a small recovery system to slowly remove ballast after the storm flow has subsided. In this case, recovered ballast, such as magnetite, may be stored in a slurry tank. Such embodiments may be more attractive to plants that do not have segregated off-line treatment trains available.

In certain embodiments, a ballasted biological treatment system may be used to provide secondary treatment of storm water that flows into existing wastewater treatment facilities using a distinct zone at the discharge end of a bioreactor. This system may be utilized at plants that experience high storm water flow events that exceed existing secondary treatment capacity and may be used to improve effluent quality during high flow, storm, or rainfallevents.

In embodiments where offline tankage is utilized, the offline tankage may be brought online rapidly to turn unused bioreactor and clarifier tanks into a standby high-capacity secondary treatment system. At least a portion of excess flow from a high flow event, such as a rain storm or snow storm, or flooding condition, may be diverted from an active system to a standby system that incorporates a ballasted biological treatment. In certain embodiments, the active system may also incorporate ballasted biological treatment. Some ballasted activated sludge may be diverted from the active system to at least one of the reactor tankage of the standby system during the mobilization of the standby system, thus transforming the standby system temporarily into a ballasted biological treatment system, without requiring additional tankage.

At a point during, at the end of or after the high flows subside or in a situation in which wastewater flow no longer needs to be diverted to the standby system, waste sludge may be slowly removed from the typically off-line system and the recovered ballast may be stored in at least one of a slurry tank, a mixing tank, or other off-line reactor tank. The system may then be returned to off line status slowly once the elevated flows have subsided. A relatively small ballast recovery system may be used with an optional slurry tank to recover and store at least a portion of the ballast for use during the next significant high flow event. Alternatively, the ballast may be stored and recovered in the existing standby bioreactor tankage.

In some conventional wastewater treatment plants, there may be excess activated sludge treatment trains for average day conditions, but not enough trains for peak storm events. In certain embodiments of the disclosure, the high flow treatment capabilities at plants may be enhanced by using at least one of a bioreactor and a clarifier that is off-line during normal operations such as dry weather flow. Normal operations include periods of time when there are no high flow events, for example, times when there are no rain or snow storm or other flooding conditions. For example, a relatively large treatment plant, such as a publically owned treatment works (POTWs) may have a certain number of activated sludge treatment trains and a predetermined fraction or percentage of those treatment trains are in operation, or active, during normal operation. For example, a treatment plant may comprise eight activated sludge treatment trains and may typically only run only six out of the eight trains. In certain embodiments, the plant may utilize the six active trains as typical activated sludge treatment trains. In other embodiments, the plant may implement a ballasted biological treatment system for the six active trains. Trains 1 and 8 may remain in offline mode until a high flow event, at which point at least a portion of the wastewater, for example, a portion of the high flow wastewater may be diverted to at least one of these two trains as the flow increases. At least one of these two trains may then temporarily be utilized as ballasted biological treatment trains to provide secondary treatment for the high flow. As the flow increases, ballasted return activated sludge may then be recycled to these two trains. The ballasted return activated sludge, in some embodiments may be recycled to any one or more of any of the treatment trains in use. The ballasted returned activated sludge may then mix with the influent wastewater in aeration tanks of those trains, essentially turning the two trains into temporary ballasted biological treatment trains. In some embodiments, they may be run at reduced mixed liquor suspended solids (MLSS) concentrations, perhaps in a range of about 800 to about 1,200 mg/l range, providing biological oxygen demand (BOD) and total suspended solids (TSS) removal without overloading the secondary clarifiers. The use of magnetic ballast such as magnetite along with a flocculant, for example, polymer, may allow very high surface overflow rates (SOR's) to be achieved in the secondary clarifiers, likely providing treatment for all storm flow without the need for any new bioreactor or clarifier tankage.

According to certain embodiments, a method for treating wastewater may be provided. The method may comprise introducing a first wastewater stream to a first bioreactor to provide a first mixed liquor. The method may further comprise introducing a second wastewater stream to a second bioreactor to provide a second mixed liquor. The first bioreactor may be in a first treatment train and the second bioreactor may be in a second treatment train. The method may further comprise separating the first mixed liquor in a first clarifier to provide a first treated effluent and a first activated sludge. The method may further comprise separating the second mixed liquor in a second clarifier to provide a second treated effluent and a second activated sludge. The first clarifier may be in a first treatment train and the second clarifier may be in a second treatment train. The method may further comprise introducing a ballast to at least one of the second activated sludge and the second bioreactor to provide a ballasted activated sludge.

The step of introducing the ballast to the at least one of the second activated sludge and the second bioreactor may comprise mixing the ballast and the second activated sludge in an optional mixing tank. The method may further comprise introducing a portion of the ballasted activated sludge to a ballast recovery subsystem prior to the mixing tank to provide a recovered ballast and a waste sludge. The method may further comprise storing the recovered ballast in a slurry tank. The method may further comprise introducing the recovered ballast from the slurry tank to the mixing tank.

The method may further comprise introducing a portion of the first activated sludge to at least one of the first bioreactor, the second bioreactor, and the mixing tank. A portion of the second activated sludge may be introduced to at least one of the first bioreactor and the second bioreactor. The method may further comprise introducing a polymer downstream of the second bioreactor and upstream of the second clarifier. The method may further comprise introducing a polymer downstream of the first bioreactor and upstream of the first clarifier. The method may further comprise adding a ballast, such as fresh or recovered ballast, to the mixing tank.

The ballast may comprise a magnetic material to provide a magnetic ballast. The magnetic ballast may comprise an inert material. The magnetic ballast may comprise a ferromagnetic material. The magnetic ballast may comprise ironcontaining material. In certain embodiments, the magnetic ballast may comprise an iron oxide material. For example, the magnetic ballast may comprise magnetite ($Fe_3O_4$). The magnetic ballast may have a particle size that allows it to bind with biological flocs to provide enhanced settling or clarification, and allow it to be attracted to a magnet so that it may be separated from the biological flocs. The particle size of the magnetic ballast may be less than about 100 micrometers (μm). The particle size of the magnetic ballast may be less than about 40 μm. The particle size of the magnetic ballast may be less than about 20 μm. Ballast may be referred to as a source of ballast which may comprise at least one of a fresh, unused ballast and a recovered or recycled ballast.

The total flow of the first wastewater stream and the second wastewater stream may be between about 1,500 gallons per day per square foot of a surface area of the clarifier to about 5,000 gallons per day per square foot of the surface area of the clarifier. In certain embodiments, the total flow of the first wastewater stream and the second wastewater stream may be between about 3000 gallons per day per square foot of a surface area of the clarifier to about 5,000 gallons per day per square foot of the surface area of the clarifier. The second wastewater stream may be introduced to the second bioreactor based on a high flow event. The high flow event may comprise a storm. The ballasted activated sludge may be introduced to the ballast recovery subsystem based on a termination of a high flow event.

The high flow event may provide an increase in wastewater flow to the one or more bioreactors or one or more treatment trains. In certain embodiments, the treatment trains may provide one or more bioreactors in series. The increase in wastewater flow may be divided between at least two bioreactors so that the wastewater may be treated. The increase in wastewater flow may be divided between at least two bioreactors so that the wastewater may be treated to provide an effluent that complies with local or federal regulations. For example, the wastewater flow into first bioreactor may comprise about 50 percent of the additional wastewater introduced to the flow based on the high flow event. The remaining wastewater flow into the second bioreactor may comprise the remaining additional wastewater introduced to the flow based on the high flow event. Other percentages of the additional wastewater flow may be directed to each of the bioreactors based on parameters such as size of each of the bioreactors, desired effluent quality including concentrations of total suspended solids, total solids, nitrate content, ammonia content, biological oxygen demand (BOD), chemical oxygen demand (COD), phosphorus content, and turbidity.

In certain embodiments, ballasted biological treatment may be temporarily introduced to at least one bioreactor or treatment train that is operational, or active, during a high flow event. Such an embodiment may be appropriate in cases where no segregated off-line treatment trains are available. Such an embodiment may also be appropriate where ballasted biological treatment may not be part of the normal operational trains. The return activated sludge may be delivered through a ballast mixing tank to rapidly ballast the return activated sludge on its way to the storm treatment trains. A relatively small ballast recovery system, such as a magnetite recovery system, may be installed in such cases. Some configurations of this embodiment may provide for no sludge to be wasted from these trains during at least a portion of the high event, so that no ballast recovery would take place until a predetermined point during, at the end of, or after the high flows subside or in a situation in when there are no rain or snow storm or other flooding conditions. In certain embodiments, ballast recovery may be initiated based on a termination of a high flow event. For example, after the period of high flow treatment, the recovery system may slowly recover the ballast and hold it in a slurry tank until the next high flow event. Continuous or intermittent aeration to the slurry tank may be employed. The intermittent aeration may be employed in certain instances for odor control. Using ballasted biological treatment for temporary secondary treatment during storm events may be very cost effective, since it would not require the addition of either secondary clarifiers or a ballasted biological treatment system, making the most of existing infrastructure.

In certain embodiments, a step feed process or system may be implemented in conjunction with ballasted biological treatment to divert a portion of the incoming wastewater into a downstream portion of a biological reactor for secondary treatment. In some embodiments, a system may be provided comprising a bioreactor comprising a first inlet fluidly connected to a source of wastewater. The bioreactor may comprise a second inlet fluidly connected to the source of wastewater and positioned downstream of the first inlet, and a contact zone adjacent the second inlet and defined by at least a portion of a wall of the bioreactor, downstream of the second inlet. The bioreactor may also comprise a ballasted mixed liquor outlet fluidly connected of the contact zone. The system may comprise a clarifier fluidly connected downstream of the outlet of the bioreactor and may comprise a treated effluent outlet and a ballasted activated sludge outlet or an activated sludge outlet. The system may also comprise a ballast subsystem fluidly connected downstream of the clarifier and may comprise a ballast recovery system fluidly connected to the ballasted activated sludge outlet or an activated sludge outlet of the clarifier and a source of ballast fluidly connected to the bioreactor.

Certain embodiments may involve using a ballasted biological treatment system combined with at least one baffle and partial wastewater bypass to a zone in a portion of the bioreactor. The zone may be positioned to provide for a portion of the incoming wastewater flow to be diverted to a position in the bioreactor that is downstream of the inlet of the bioreactor. The zone may be positioned, for example, at an end of the bioreactor adjacent an outlet of the bioreactor. The zone may or may not have one or more physical barriers that divide the contact zone from the remaining portion of the bioreactor. This zone could be referred to as a contact zone or a storm flow contact zone. The contact zone may occupy a predetermined portion of the bioreactor. The volume of the contact zone may be selected to provide a sufficient portion of the flow of wastewater being introduced into the bioreactor. The volume may be between about 10 percent to about 15 percent of the bioreactor volume. One or more baffles may be positioned in the bioreactor to define the contact zone.

In some embodiments, to divert a portion of the wastewater flow to the contact zone, a wastewater bypass line may be installed. This bypass line may be to divert a portion of the wastewater around a majority of the bioreactor and into the contact zone. This contact zone and bypass line would be used during high flow events to help maintain most of the biomass within the bioreactor, where it performs treatment, as opposed to unnecessarily overloading the clarifier with solids and storing them in the clarifier, where there is no treatment.

In certain embodiments, treatment efficiency may be reduced during a high flow period, because of the reduced hydraulic retention time (HRT) and increased food to microorganism (F/M) ratio in the contact zone. However, adequate biological oxygen demand (BOD) and total suspended solids (TSS) removals may result to comply with local, state, or federal regulations, and is a more efficient option than conventional configurations that completely bypass flow around the secondary treatment. With the use of a contact zone in the ballasted bioreactor, the reduced concentration of ballasted mixed liquor, and the option to add a flocculant, would allow significantly higher flows to be treated in the secondary clarifiers. Such a system may provide for the removal of about 85 percent to about 90 percent or greater of BOD and TSS even during a high flow event. This configuration may allow activated sludge systems to treat higher peak flows from storm events and allow for faster settling biological solids, reduced clarifier solids loading rates, enhanced bioreactor kinetics, reduced solids loss and associated pollutant loss from secondary clarifiers.

In certain embodiments, a portion of or the entire wastewater flow could be bypassed to the storm flow contact zone, instead of only a portion of the flow.

According to certain embodiments a method for treating wastewater is provided. The method may comprise introducing a first portion of a wastewater to a first inlet of a bioreactor. The method may further comprise introducing a second portion of the wastewater to a second inlet of the bioreactor, the second inlet positioned downstream of the first inlet. The method may further comprise introducing a ballast to the bioreactor. The method may further comprise separating a ballasted mixed liquor generated in the bioreactor to provide a treated effluent and a ballasted activated sludge in a clarifier. The method may further comprise separating the ballasted activated sludge to provide a recovered ballast and a waste activated sludge.

A portion of the ballasted activated sludge may be introduced to the bioreactor. In addition or in the alternative a portion of the recovered ballast may be introduced to the bioreactor. The ballast may comprise a magnetic material, such as magnetite. The wastewater may be treated at a rate of about 1,500 gallons per day per square foot of a surface area of the clarifier to about 5,000 gallons per day per square foot of the surface area of the clarifier. In certain embodiments the wastewater may be treated at a rate of about 3,000 gallons per day per square foot of a surface area of the clarifier to about 5,000 gallons per day per square foot of the surface area of the clarifier.

Turning to the figures, FIG. 1A presents a schematic of water treatment system 100 utilizing standby tankage in operational mode in accordance with one or more embodiments of the disclosure. First wastewater stream 103 from a source of wastewater may be introduced to first bioreactor 106. First bioreactor 106 may comprise a profile of biological species configured to treat wastewater stream 103. Bioreactor 106 may be a component in the routine, daily operation of system 100. Second wastewater stream 104 from the source of wastewater may be introduced to second bioreactor 109. Like first bioreactor 106, second bioreactor 109 may comprise a profile of biological species configured to treat the contents of second wastewater stream 104. Bioreactor 109 may be placed in a standby mode during routine operation of system 100. Bioreactor 109 may be mobilized for high flow events. A rainstorm or a snow storm (rapid snow melt) may be an example of a high flow event.

First bioreactor 106, or first treatment train 106, provides first mixed liquor 110. First mixed liquor 110 may comprise an activated sludge and liquid. The activated sludge may comprise biological solids. Second bioreactor 109, or second treatment train 109, provides second mixed liquor 111. Second mixed liquor 111 may comprise an activated sludge and liquid. Second mixed liquor 111 may comprise a ballasted mixed liquor. The ballasted mixed liquor may comprise a magnetic ballasted mixed liquor. The ballasted mixed liquor may comprise a magnetite ($Fe_3O_4$) ballasted mixed liquor. First flocculant 112 may be optionally introduced to first mixed liquor 110. Second flocculant 113, which may be the same or different from first flocculant 112, may be optionally introduced to second mixed liquor 111. Flocculant 112 and flocculant 113 may comprise a polymer. First mixed liquor 110 may be introduced to first clarifier 115. First clarifier 115 may provide first treated effluent 121 and first activated sludge 124. A portion of first activated sludge 124 may exit system 100 for further processing and/or disposal as waste activated sludge 127. A portion of first activated sludge 124 may be returned to first bioreactor 106 as first return activated sludge 130.

Second mixed liquor 111 may be introduced to second clarifier 118. Second clarifier 118 may provide second treated effluent 122 and second activated sludge 133. Second activated sludge 133 may comprise a ballasted activated sludge. A portion of second activated sludge 133 may be directed to ballast subsystem comprising ballast recovery system 145. Ballast recovery system 145 may be configured to separate sludge stream 139 to provide recovered ballast 142 and waste sludge 138. Ballast recovery system 145 may comprise a magnetic drum separator. Ballast recovery system 145 may comprise a shearing mill. Waste sludge 138 may exit system 100 for further processing and/or disposal. Recovered ballast 142 may be directed to slurry tank 148, an optional component of system 100, where it may be stored. Fresh ballast 154, as well, may be introduced to slurry tank 148. Ballast 143, or source of ballast, may comprise at least one of recovered ballast and fresh ballast.

A portion of activated sludge may be returned to bioreactor 109 as return activated sludge 136, which may comprise ballasted return activated sludge. A portion of activated sludge 133 and/or second mixed liquor 111 may be directed to mixing tank 151 where activated sludge 133 is introduced to ballast 143, or source of ballast, to provide ballasted activated sludge (also referred to as ballasted solids) 137. Activated sludge 133 and ballast 143 may be mixed. Ballasted activated sludge (or ballasted solids) 137 may be directed to bioreactor 109 as a ballasted return activated sludge.

System 100 may continue the described cycle as long as is necessary before, during, and after a high flow event. However, delivery of second wastewater stream 104 to second bioreactor 109 may be triggered based on a high flow event. If a high flow event begins, it may be sensed by a sensor which may trigger diversion of a portion of the wastewater to second wastewater stream 104 and to second bioreactor 109. This may allow for second bioreactor 109 to treat second wastewater stream 104 in a ballasted biological treatment process, while first wastewater stream 103 which is processed through bioreactor 106 in an activated sludge process. Once the high flow event has ended, it may be sensed by a sensor which may trigger ceasing diversion of a portion of the wastewater to second wastewater stream 104 to bioreactor 109. Delivery of second wastewater stream 104 to second bioreactor 109 and terminating delivery of second wastewater stream 104 to bioreactor 109 may be performed manually in lieu of a sensor system.

In the embodiment of FIG. 1A, during normal operation, first bioreactor 106 and second bioreactor 109 may be in use. Upon commencement of a high flow event, activated sludge may be diverted to mixing tank 151 in order to mix with ballast 143 so that ballasted activated sludge 137 may be introduced to second bioreactor 109. In certain embodiments, ballasted activated sludge may also be introduced to first bioreactor 106.

At a point during, at the end of, or after the high flows subside, or in a situation in which wastewater flow no longer needs to be diverted to the standby system, waste sludge may be slowly removed from the one or more bioreactors that are being utilized as ballasted biological treatment systems, and the recovered ballast may be stored in at least one of a slurry tank, a mixing tank, or other off-line reactor tank. As shown in FIG. 1A, at least a portion of second activated sludge 133, which would flow as return activated sludge 136 to bioreactor 109 would be diverted to ballast recovery subsystem 145. Ballast recovery subsystem 145 may be configured to separate sludge stream 139 to provide recovered ballast 142 and waste sludge 138.

In the embodiment of FIG. 1A, more than two bioreactors or treatment trains may be in use, and one or more bioreactors or treatment trains may be converted to a ballasted biological treatment system during high flow events. In certain embodiments of as described related to FIG. 1A, first clarifier 115 and second clarifier 118 may be one clarifier, allowing first mixed liquor 110 and second mixed liquor 111 to be delivered to the one clarifier.

Figure 1B:
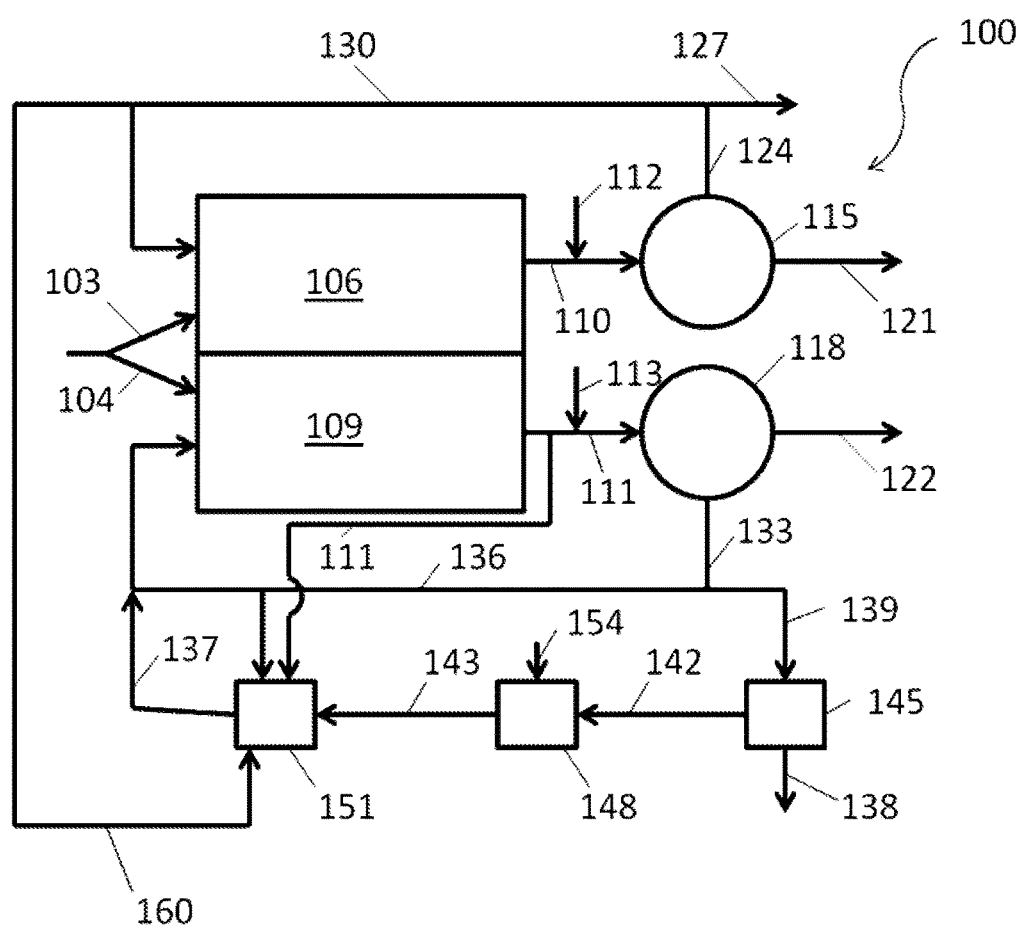
FIG. 1B presents a schematic of a water treatment system utilizing standby tankage in mobilization mode in accordance with one or more embodiments of the disclosure.

FIG. 1B presents a schematic of a water treatment system utilizing standby tankage in a mobilization stage in accordance with one or more embodiments of the disclosure. Before mobilization, or before a high flow event, second bioreactor 109 and clarifier 118 may be offline. To prepare for activation, a portion of activated sludge 160 fluidly downstream of clarifier 115 may be directed towards mixing tank 151 to produce a ballasted activated sludge (or ballasted solids) 137 directed to bioreactor 109 which is then brought online. In some embodiments, mixing tank may not be necessary; in these embodiments, ballast may be present in offline second bioreactor 109, and may be brought online by introducing a portion of activated sludge 160 directly to second bioreactor 109. Second wastewater 104 may be introduced to second bioreactor 109 at any time while second bioreactor 109 is being brought online or anytime thereafter.

Figure 1C:
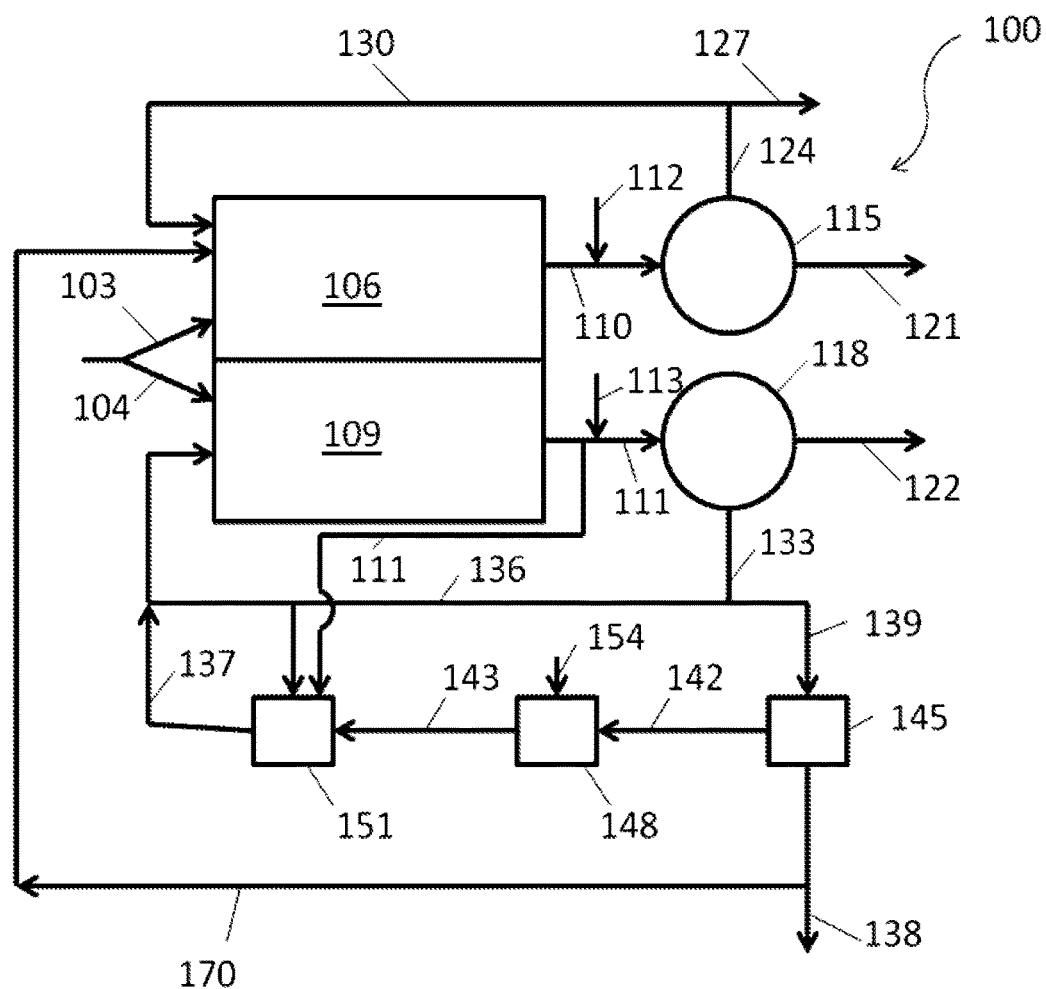
FIG. 1C presents a schematic of a water treatment system utilizing standby tankage in demobilization mode in accordance with one or more embodiments of the disclosure.

FIG. 1C presents a schematic of a water treatment system utilizing standby tankage in a demobilization stage in accordance with one or more embodiments of the disclosure. When bioreactor 109 is ready to be brought offline, at least a portion of sludge stream 139 is introduced to first bioreactor 106, and is shown in FIG. 1C as sludge line 170 as part of a demobilization process. In some embodiments, a portion of second activated sludge 133 may be introduced to first bioreactor 106 as part of a demobilization process.

Figure 2:
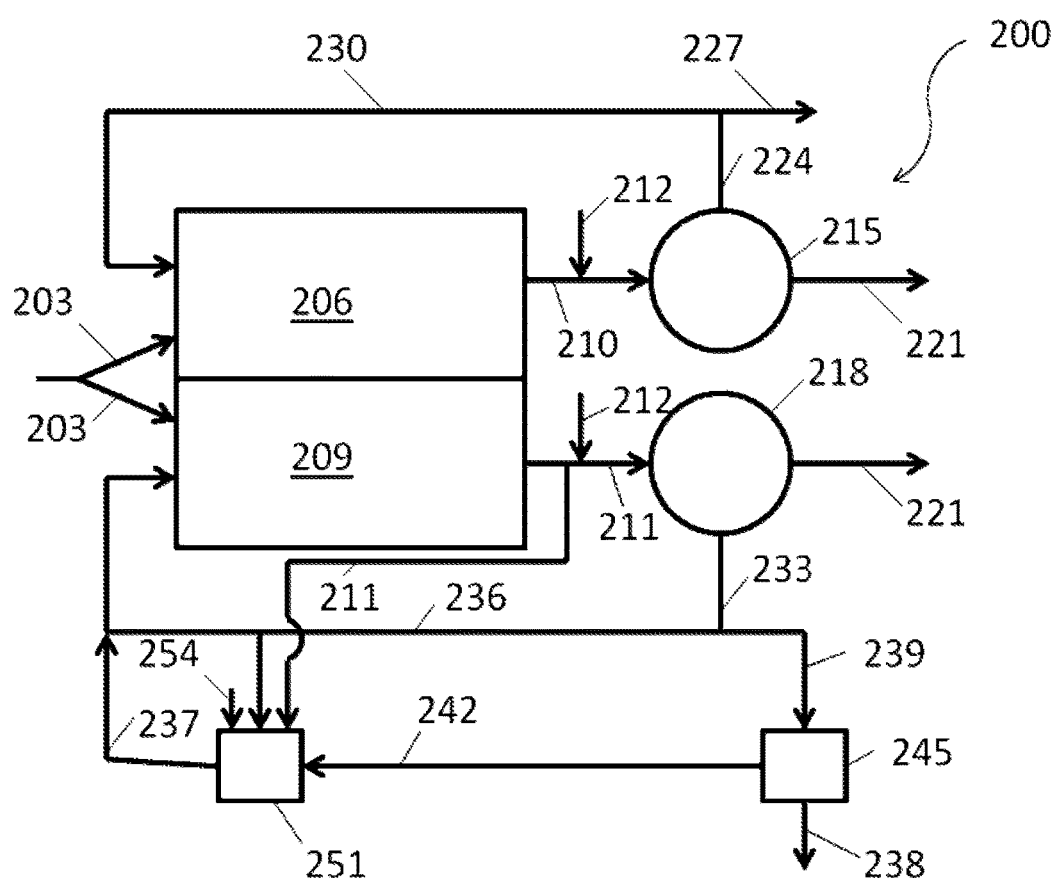
FIG. 2 presents a schematic of a water treatment system utilizing standby tankage in accordance with one or more embodiments of the disclosure.

FIG. 2 presents a schematic of a water treatment system utilizing standby tankage in accordance with one or more embodiments of the disclosure. FIG. 2 presents an alternative embodiment to FIG. 1. In FIG. 2 the slurry tank is removed. Activated sludge 239 may be introduced to ballast recovery subsystem 245, to provide recovered ballast 242 and waste sludge 238. Recovered ballast 242 may be introduced to mixing tank 251 or may be stored in second bioreactor 209. Fresh ballast 254 may also be introduced to mixing tank 251. Activated sludge 236 may be introduced to mixing tank 251. Mixing tank 251 may provide ballasted activated sludge (or ballasted solids) 237 directed to bioreactor 209.

Figure 3:
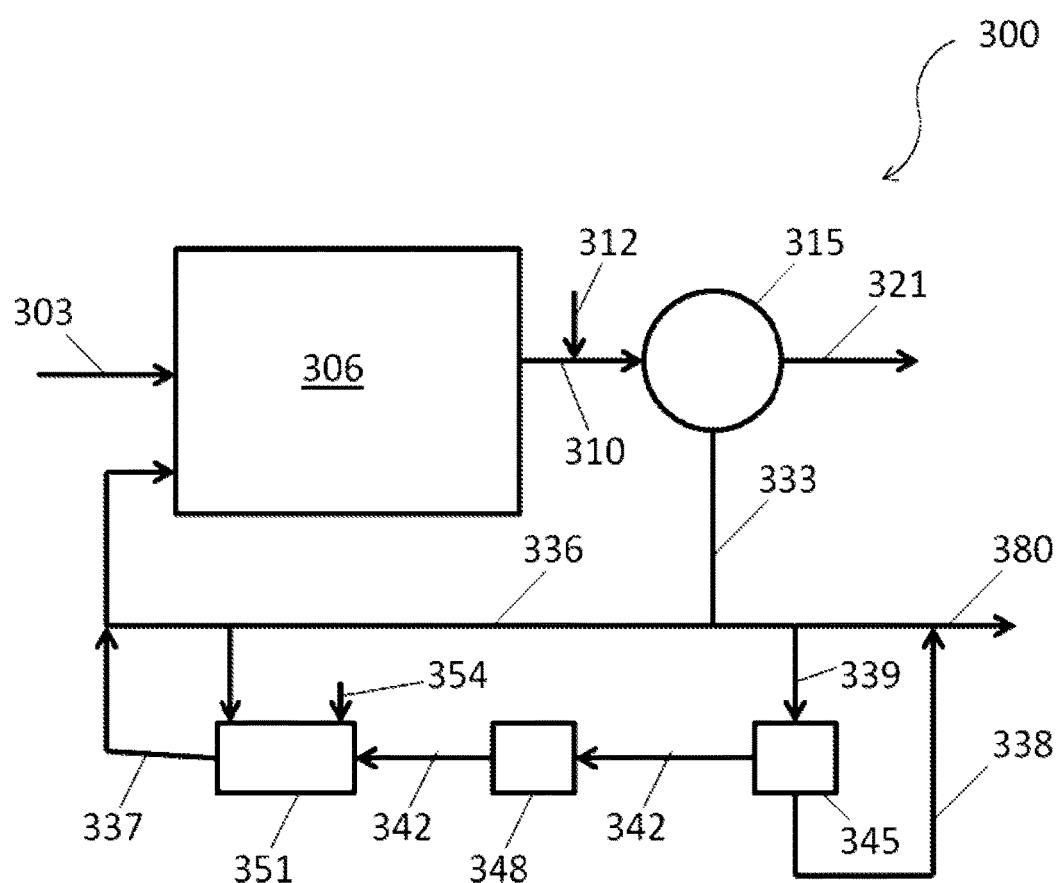
FIG. 3 presents a schematic of a water treatment system in accordance with one or more embodiments of the disclosure.

FIG. 3 presents a schematic of a water treatment system in accordance with one or more embodiments of the disclosure. System 300 may be configured to implement its ballasted biological treatment components periodically and selectively. For example, it may implement its ballasted biological treatment components only during a high flow event, for example, a storm. It may utilize its ballasted biological treatment components only during a season, for example, a storm season or flood season. During certain periods of operation, for example, non-storm or non-high flow periods, wastewater stream 303 may enter bioreactor 306 for secondary treatment. Bioreactor 306 may comprise one or more bioreactors or one or more treatment trains. Mixed liquor 310 may exit bioreactor 306. Flocculant 312, for example polymer, may be or may not be introduced to mixed liquor 310 to encourage flocculation or biological treatment of solids in mixed liquor 310. Mixed liquor 310 may enter clarifier 315. Clarifier 315 may be one or more clarifiers. The number of clarifiers may be based on the number of bioreactors in use. In clarifier 315, mixed liquor 310 may be separated into treated effluent 321 and activated sludge 333. A portion of activated sludge 333 may be directed out of system 300 as waste sludge 380. A portion of activated sludge 333 may be directed back to reactor 306 as return activated sludge 336. This cycle may repeat.

During other periods of operation, for example, high flow events, the ballasted biological treatment components of system 300 may be implemented. Activated sludge 333 may comprise a ballasted activated sludge, which may be delivered from the clarifier through a ballasted activated sludge outlet. A portion of activated sludge 333 may be directed to ballast recovery subsystem 345. Ballast recovery subsystem 345 may optionally produce recovered ballast 342 and waste sludge 338 directed out of system 300 for processing and disposal. Optionally, slurry tank 348 may receive recovered ballast 342. Fresh ballast 354 may be fed to slurry tank 348 or mixing tank 354. Ballast 343 which may comprise recovered ballast 342 and/or fresh ballast 354 may enter mixing tank 351. Mixing tank 351 produces ballasted activated sludge 337 which is directed back to bioreactor 306. This cycle may repeat.

Figure 4:
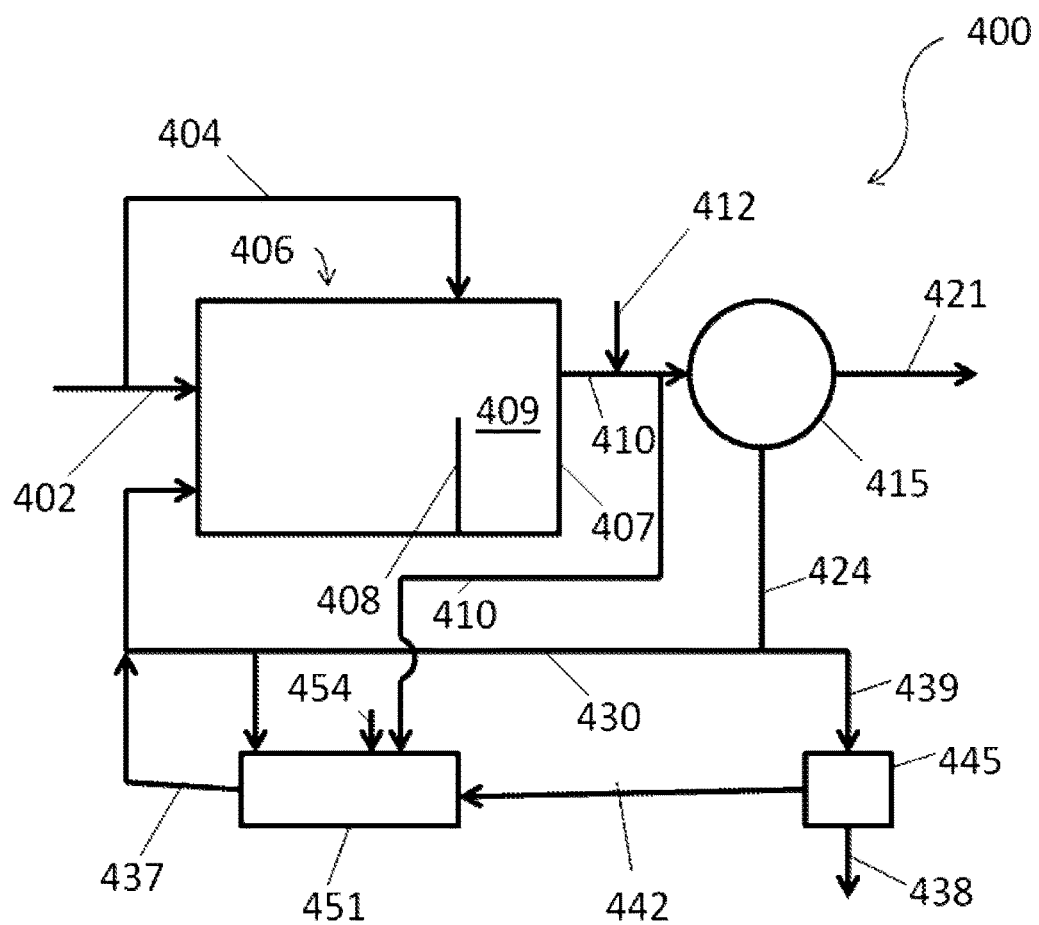
FIG. 4 presents a schematic of a water treatment system utilizing a bypass in accordance with one or more embodiments of the disclosure.

FIG. 4 presents a schematic of a water treatment system 400 utilizing a bypass or step-feed, in accordance with one or more embodiments of the disclosure. During normal operation, wastewater stream 402 may enter an inlet of bioreactor 406 for biological treatment throughout the full volume of bioreactor 406. In the case of a high flow event full biological treatment of all influent could potentially overwhelm clarifier 415. At least a portion of wastewater 404 may be diverted to a second inlet of bioreactor 406 downstream of the first inlet. This bypass wastewater stream 404 may be directed to contact zone 409 within bioreactor 406 to provide biological treatment to bypass stream 404 for at least a portion of the volume of bioreactor 406. Partial treatment may be preferable to the complete bypass of biological treatment that often takes place at wastewater treatment plants during a high flow event. Contact zone 409 may be partially defined by a portion of wall 407 of bioreactor 406. Overflow baffle 408 may be optionally placed inside bioreactor 406 to further partially define contact zone 409. One or more baffles may be positioned in the bioreactor to define the contact zone. Contact zone 409 may be on the mixed liquor effluent end of bioreactor 406. Bioreactor 406 may generate mixed liquor 410 which may exit an outlet of bioreactor 406. The outlet may be downstream of contact zone 409. Mixed liquor 410 may comprise a ballasted mixed liquor. The ballast may comprise a magnetic material. The ballast may comprise magnetite. Flocculant 412 may be added to mixed liquor 410. Flocculant 412 may comprise a polymer. Flocculant 412 may encourage further growth of solids in mixed liquor 410. Mixed liquor 410 may be introduced to clarifier 415. Clarifier 415 may separate the contents of mixed liquor 410 to produce treat effluent 421, which may exit clarifier 415 through a treated effluent outlet, and activated sludge 424, which may exit clarifier 415 through a ballasted activated sludge outlet. Activated sludge 424 may comprise a ballasted activated sludge. Activated sludge 424 may then be directed to a ballast subsystem. A portion of activated sludge 439 may be directed to ballast recover system 445. Ballast recovery system 445 may separate out the ballast from the sludge. Ballast recovery system 445 may comprise, for example, a magnetic drum separator. Ballast recovery system 445 may also comprise, for example, a sheer mill. Waste sludge 438 may exit recovery system 445 and go on to further treatment and/or disposal. Recovered ballast 442 may exit recovery system 445 and may be delivered to a slurry tank in certain embodiments, or it may be delivered directly to ballast mixing tank 451.

Ballast mixing tank 451 may comprise an inlet or inlets for a source of ballast. The source of ballast may be recovered ballast 442 or it may be fresh ballast 454 or both. Ballast mixing tank 451 may comprise an inlet for receiving at least a portion of return activated sludge 430. Ballast mixing tank 451 may comprise an inlet for receiving mixed liquor 410. Ballast mixing tank may comprise at least one of a recovered ballast inlet, a fresh ballast inlet, a return activated sludge inlet, and a mixed liquor inlet. Ballast mixing tank 451 may comprise an outlet to provide ballasted activated sludge 437. Ballasted activated sludge 437 may then be directed into bioreactor 406. A portion of return activated sludge 430 may also be directed to bioreactor 406.

The description and figures provided are for example only and are not intended to be limiting. Individual components depicted in the figures or the description may also encompass that component in at least one of in series and in parallel with additional same components or other components.

While exemplary embodiments of the disclosure have been disclosed many modifications, additions, and deletions may be made therein without departing from the spirit and scope of the disclosure and its equivalents, as set forth in the following claims.

Those skilled in the art would readily appreciate that the various configurations described herein are meant to be exemplary and that actual configurations will depend upon the specific application for which the system and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a wastewater treatment system. It is, therefore, to be understood that the foregoing embodiments are presented by way of example only and that, within the scope of the appended claims and equivalents thereto, the disclosed system and methods may be practiced otherwise than as specifically described. The present system and methods are directed to each individual feature or method described herein. In addition, any combination of two or more such features, apparatus or methods, if such features, system or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise at least one of a clarifier, a ballasted biological treatment system, and a ballast recovery system. Accordingly, the foregoing description and drawings are by way of example only. Further, the depictions in the drawings do not limit the disclosures to the particularly illustrated representations.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A method of treating wastewater comprising:
   introducing a first wastewater stream to a first bioreactor to provide a first mixed liquor;
   introducing a second wastewater stream to a second bioreactor to provide a second mixed liquor, the first bioreactor and the second bioreactor arranged in parallel;
   separating the first mixed liquor in a first clarifier to provide a first treated effluent and a first activated sludge;
   separating the second mixed liquor in a second clarifier to provide a second treated effluent and a second activated sludge, the first clarifier and the second clarifier arranged in parallel;
   introducing a ballast to at least one of the second activated sludge and the second bioreactor to provide a ballasted activated sludge, wherein introducing the ballast comprises mixing the ballast and the second activated sludge in a mixing tank; and
   introducing a portion of the ballasted activated sludge to a ballast recovery subsystem responsive to a termination of a high flow event, prior to mixing the ballast and the second activated sludge in the mixing tank, to provide a recovered ballast and a waste sludge.

2. The method of claim 1, further comprising storing the recovered ballast in a slurry tank.

3. The method of claim 2, further comprising introducing the recovered ballast from the slurry tank to the mixing tank.

4. The method of claim 1, further comprising introducing a portion of the first activated sludge to at least one of the first bioreactor, the second bioreactor, and the mixing tank.

5. The method of claim 4, further comprising introducing a portion of the second activated sludge to at least one of the first bioreactor and the second bioreactor.

6. The method of claim 1, further comprising introducing a polymer downstream of the second bioreactor and upstream of the second clarifier.

7. The method of claim 6, further comprising introducing a polymer downstream of the first bioreactor and upstream of the first clarifier.

8. The method of claim 1, further comprising adding at least one of fresh and recovered ballast to the mixing tank.

9. The method of claim 1, wherein the ballast is magnetite.

10. The method of claim 1, wherein a total flow of the first wastewater stream and the second wastewater stream is about 1,500 gallons per day per square foot of a surface area of clarifier to about 5,000 gallons per day per square foot of the surface area of clarifier.

11. The method of claim 1, wherein the second wastewater stream is introduced to the second bioreactor responsive to a high flow event.

* * * * *